US009552617B2

(12) United States Patent
Modro et al.

(10) Patent No.: US 9,552,617 B2
(45) Date of Patent: Jan. 24, 2017

(54) MOBILE MEDIA, DEVICES, AND SIGNALING

(71) Applicant: Digimarc Corporation, Beaverton, OR (US)

(72) Inventors: Sierra K. Modro, Portland, OR (US); Ravi K. Sharma, Portland, OR (US); Brian T. MacIntosh, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 18 days.

(21) Appl. No.: 14/463,180

(22) Filed: Aug. 19, 2014

(65) Prior Publication Data
US 2015/0043890 A1    Feb. 12, 2015

Related U.S. Application Data

(62) Division of application No. 12/650,306, filed on Dec. 30, 2009, now abandoned.
(Continued)

(51) Int. Cl.
*G06K 9/00* (2006.01)
*G06T 1/00* (2006.01)
(Continued)

(52) U.S. Cl.
CPC ........... *G06T 1/005* (2013.01); *G06K 9/00577* (2013.01); *G06T 1/0021* (2013.01); *H04N 1/3232* (2013.01); *H04N 1/32309* (2013.01); *H04N 5/232* (2013.01); *H04N 5/278* (2013.01); *H04N 9/7904* (2013.01); *H04N 9/87* (2013.01);
(Continued)

(58) Field of Classification Search
None
See application file for complete search history.

(56) References Cited

U.S. PATENT DOCUMENTS 5,027,400 A    6/1991  Nakano
5,559,949 A    9/1996  Reimer
(Continued)

OTHER PUBLICATIONS

Bender, Techniques for Data Hiding, IBM Systems Journal, vol. 35, Nos. 3&4, 1996.
(Continued)

*Primary Examiner* — Nancy Bitar
(74) *Attorney, Agent, or Firm* — Digimarc Corporation

(57) ABSTRACT

Consumer uses of mobile devices and electronic media are changing. Mobile devices include increased computational capabilities, mobile broadband access, better integrated sensors, and higher resolution screens. These enhanced features are driving increased consumption of media such as images, maps, e-books, audio, video, and games. As users become more accustomed to using mobile devices for media, opportunities arise for new digital watermarking usage models. For example, transient media, like images being displayed on screens, can be watermarked to provide a link between mobile devices, extending the reach of digital watermarking. Digital fingerprinting can also be employed. Applications based on these emerging usage models can provide richer user experiences and drive increased media consumption. A great variety of other features and arrangements are also detailed.

15 Claims, 3 Drawing Sheets

Related U.S. Application Data

(60) Provisional application No. 61/142,127, filed on Dec. 31, 2008.

(51) Int. Cl.
  *H04N 5/232* (2006.01)
  *H04N 1/32* (2006.01)
  *H04N 5/278* (2006.01)
  *H04N 9/79* (2006.01)
  *H04N 9/87* (2006.01)

(52) U.S. Cl.
  CPC ............... *G06T 2201/0065* (2013.01); *H04N 2201/0089* (2013.01)

(56) References Cited

U.S. PATENT DOCUMENTS

| | | | |
|---|---|---|---|
| 5,774,664 A | 6/1998 | Hidary | |
| 5,931,908 A | 8/1999 | Meiseles | |
| 6,067,621 A * | 5/2000 | Yu | G06F 21/34 713/168 |
| 6,240,555 B1 | 5/2001 | Shoff | |
| 6,263,505 B1 | 7/2001 | Walker | |
| 6,505,160 B1 | 1/2003 | Levy | |
| 6,611,607 B1 | 8/2003 | Rodriguez | |
| 6,637,032 B1 | 10/2003 | Feinleib | |
| 6,722,569 B2 * | 4/2004 | Ehrhart | G06K 9/00442 235/462.04 |
| 7,197,156 B1 | 3/2007 | Levy | |
| 2003/0219129 A1 * | 11/2003 | Whelan | H04L 9/0891 380/270 |
| 2004/0028257 A1 | 2/2004 | Proehl | |
| 2004/0098609 A1 * | 5/2004 | Bracewell | H04L 63/068 726/6 |
| 2004/0172531 A1 * | 9/2004 | Little | G06F 21/335 713/155 |
| 2004/0188519 A1 * | 9/2004 | Cassone | G06Q 10/02 235/382 |
| 2006/0062426 A1 * | 3/2006 | Levy | G06F 21/10 382/100 |
| 2006/0067575 A1 * | 3/2006 | Yamada | H04N 1/40062 382/176 |
| 2008/0049971 A1 | 2/2008 | Jones | |
| 2008/0140433 A1 * | 6/2008 | Levy | G06F 21/10 705/26.1 |
| 2009/0123022 A1 | 5/2009 | Null | |
| 2009/0259564 A1 * | 10/2009 | Barkerding | G06Q 20/12 705/26.1 |
| 2010/0046842 A1 * | 2/2010 | Conwell | G06F 17/30265 382/218 |
| 2010/0172540 A1 | 7/2010 | Rodriguez | |
| 2011/0161076 A1 * | 6/2011 | Davis | G06F 3/04842 704/231 |
| 2011/0244919 A1 * | 10/2011 | Aller | G06K 9/00973 455/556.1 |

OTHER PUBLICATIONS

Blackburn et al, Overview of the Audio Tools, 2007 version retrieved from the Internet Archive.

* cited by examiner

MOBILE MEDIA, DEVICES, AND SIGNALING

RELATED APPLICATION DATA

This application is a division of copending application Ser. No. 12/650,306, filed Dec. 30, 2009, which claims priority benefit to provisional application 61/142,127 filed Dec. 31, 2008.

TECHNICAL FIELD

The present technology relates to portable devices, such as PDAs, smart phones, etc., and use of such devices in conjunction with audio and visual media.

BACKGROUND AND SUMMARY

Although digital watermarking has been commercially available for several years, relatively few applications have directly targeted consumers. Traditional applications of digital watermarking such as copy prevention, copyright communication, and broadcast monitoring, involve embedding the watermark at the point of media creation or distribution and detecting the watermark either on a tethered system or a dedicated device. While these usages have utility for consumers, they are primarily of interest to content creators and media distributors.

Modes of digital media consumption are changing, fueled by the emergence of advanced computational and communications capabilities in mobile devices. Electronic media is increasingly being consumed on mobile devices. Consequently, distribution and delivery of media to mobile devices is becoming more relevant. This creates opportunities for new and emerging usage models based on digital watermarking. These usage models are enabled by the ability of digital watermarks to survive digital-to-analog-to-digital (D-A-D) transformations. In these usage models, the digital watermark serves as a link between media being played or displayed, and online content pertinent to that media.

The new usage models create new opportunities for use of digital watermarking by combining watermarking with the capabilities of mobile devices, including mobile phones, Mobile Internet Devices (MIDs), and Ultra-Mobile PCs (UMPCs). For example, transient media such as images or video displayed on a screen (e.g. LCD panel) can be watermarked and then detected using a mobile device. Applications based on these usage models can provide richer user experiences and intuitive interfaces by allowing interaction with the media itself. These applications can enable easier distribution and delivery of media on to mobile devices and drive further media consumption.

Usage models linking media content to the Internet using watermarking [1][2] and content-based identification technologies [4] have been proposed earlier. Watermarking usually imparts a content-independent identity to the media, whereas content-based identification technologies (such as digital fingerprinting, media recognition) derive an identity from the content itself. The proliferation of capable mobile devices and mobile media usage has made such models more viable and compelling. This has resulted in emerging applications based on these models. Watermarking offers benefits that can expand the applicability of some of the usage models and enables new ones.

The foregoing are just a few of the features of the technology detailed below.

DETAILED DESCRIPTION

Figure 1:
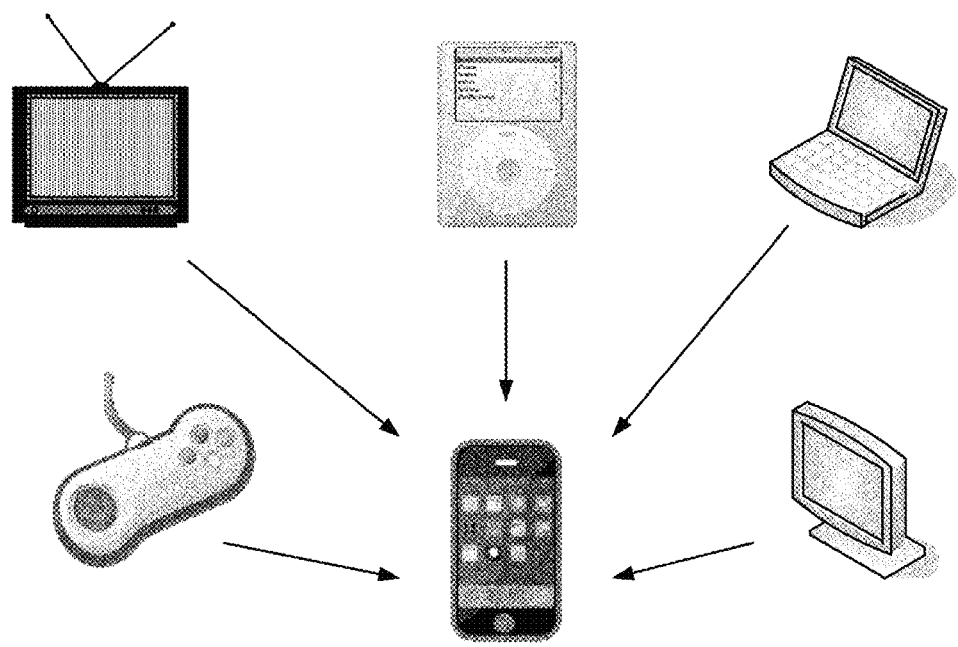
FIG. 1 shows elements employed in exemplary applications of the present technology.

Until recently, mobile devices have had restricted capabilities—limited processing power coupled with low amounts of available memory. These devices frequently had fixed focal length cameras with no macro capability, assuming they had a camera at all. The availability of mobile broadband access was limited to major metro areas only and was cost-prohibitive for average consumers.

However, the technological landscape has been changing over the last few years and the vision looking forward is much more attractive. Chip manufacturers are designing silicon specifically for ultra-low power draw while providing enhanced performance over older generations. This is improving battery life and allowing for sleeker industrial designs due to less need for bulky thermal solutions. Additionally, many new devices include improved camera capabilities, with more and more devices opting to include video recording as well.

These smaller devices are more attractive to consumers and easier to carry around regularly. As a result, consumers are using the enhanced capabilities to increase media consumption and mobile Internet access. The emergence of higher speed mobile broadband, including WiMAX and LTE (4G), allow for higher throughput for high quality video streaming while mobile, enabling mobile television usage models. Consumers are also using ultra-portable devices for general purpose computing due to the convenience of "always on, always connected" features. Accessing media through online storefronts like iTunes and Amazon.com is increasing the demand for content optimized for smaller screens. As a result of these changes, demand for higher capability mobile devices is increasing. While the demand over the last two years has been growing stronger, projections show a continued increase in demand over the next five years. This should drive further mobile consumption of media. As users consume more content while mobile, opportunities emerge for improvements to user experiences through digital watermarking.

The infrastructure for software development for mobile devices has also advanced. It is now relatively easy to develop applications for mobile devices and to deliver software to devices over a mobile broadband connection. The combination of the iPhone SDK, the App Store, and the Apple iPhone is a prime example of integration of software development infrastructure, delivery and deployment.

In addition to the enhanced capabilities of the mobile devices themselves, large high resolution flat screen monitors are affordable and capable of displaying images at high quality. This allows reading watermarks directly from the screen. Flat screens are also proliferating through digital picture frames. Also, mobile devices themselves are tending towards larger and higher resolution screens.

Usage Models For Digital Watermarking

Digital watermarks can survive Digital-Analog-Digital transformations. Robust watermarks may even survive multiple such transformations. In the past, this ability of digital watermarks has been exploited to enable print-to-web [1] applications that connect printed material containing digital watermarks with the web. The advent of powerful computational capabilities in mobile devices, and the proliferation of media consumption on these devices, provide opportunities for new and emerging digital watermarking usage models in addition to the print-to-web model.

FIG. 1 illustrates some of the implementations. A mobile device, such as a microphone- and camera-equipped iPhone, samples content presented by various other devices. These other devices can include—without limitation, broadcast and cable television receivers, audio players, video players, electronic picture frames, games and gaming consoles, laptops, etc. (Although the depicted gaming device does not include a screen, many do.)

Linking to Digitally Displayed Content

Consumption of digital media usually involves displaying the content on a display screen (such as an LCD panel) in the case of text, images, video, and games, or playing it over-the-air in the case of audio. If digital media is watermarked before the point of consumption, the watermark can provide an identity to the media. This identity can enable linking to more information about the media simply by capturing a portion of the played or displayed media using the mobile device. The watermark thus provides opportunities for intuitive interactions with the media.

Imagine a watermarked photo displayed on a screen such as a digital picture frame. By pointing at the picture frame with the camera in a mobile device, enabled with watermark detection software, the watermark in the photo can be detected and identified. On identification, the mobile device can be linked to an online photo sharing service like Flickr or Picasa. The user may then download the image or a higher resolution copy, order prints, or browse through related albums or photos. The watermark facilitates an enriched and intuitive user experience—the user just points the mobile device at the screen to obtain related information from the Internet. Availability of a broadband connection, and sufficient computational throughput for watermark detection on the mobile device, are the enabling factors in this example.

Extensions of this model include watermarking media content such as electronic maps, e-books, web pages, or even banner ads on web pages. In fact, the model can be expanded to include any content displayed on either a part of the screen or the entire screen. The move towards larger sized screens with higher resolutions for mobile devices implies that this usage model can also be applied to link displayed media on one mobile device to another mobile device.

As use of software applications on mobile devices becomes commonplace, ease of finding the right applications gains importance. Efforts such as the iTunes AppStore have begun addressing this aspect. Now consider that the user interface for an application (or other graphic display presented by the application on the screen) is watermarked. (As is familiar to the artisan, slight variations can be made to essentially any graphic, including solid colors, backgrounds, text, etc., to effect digital watermarking.) The application can then be identified by pointing to it with another device. As friends or colleagues share experiences with new mobile applications, they can link directly to the location of the application in an application store. This kind of direct sharing simplifies the discovery of applications on mobile devices and complements the convenience provided by application stores.

A similar concept can be applied to games, e.g., by watermarking the texture maps or the user interface displayed on the screen. Different watermarks can be used to identify different levels within the games. In addition to enabling sharing, watermark detection can also be used to expose additional functionality, say in the form of interaction between devices and players, rewards, or hidden features.

In other embodiments, the audio output from such applications/games can be watermarked to serve the same purposes.

Such arrangements can also be implemented by use of image or audio fingerprints. A fingerprint derived from image or audio data that is captured from an application/game is matched in a database, which then provides a link to an online store from which the application/game can be downloaded and/or purchased.

Audio Playing Over-the-Air

As indicated, the usage models described above are also applicable to audio. Linking to music played over-the-air using watermarking techniques [2] as well as content-based identification techniques [4] such as fingerprinting has been previously proposed. However, watermarking can be used to extend the model to many situations involving audio, beyond just music—including broadcast television, radio, live podcasts, in a movie theater, or even subscription and paid content playing on another mobile device. For example, consider that a listener is tuned into a live discussion or news event on radio. The listener may like to obtain a podcast of this event for later listening. The listener activates the watermark detection application on the mobile device, which reads the payload, identifies the podcast and "bookmarks" it for later use. Such usage models become more viable as computational capabilities of mobile devices support real-time watermark detection from the captured audio stream.

Video Displayed on a Screen

This usage model is based on detecting a watermark in a displayed video by capturing the video using the camera on a mobile device. The video can be displayed on an LCD screen, television, movie screen, or even on the screen of another mobile device. Following the themes described for images and audio, the detected watermark can identify the video and route the user to relevant information on the Internet.

For some videos like advertisements, identification of the video can trigger a download of the video over the broadband connection, replicating the video on the user's device. Such a response can further enable viral distribution of advertisements and teaser video. The video watermark can change dynamically along the duration of the video. This can enable different information to be relayed to the detecting mobile device at different points during the video.

This usage model can also be expanded using an amalgamation of some of the usage models described earlier. For example, the video can also be identified through the watermark in the audio accompanying the video or in the thumbnail image for the video.

Digital Signage Digital signage refers to displays, banners or billboards that use flat panel screens such as LCDs to show customizable content including advertisements, information, and entertainment. Examples of such displays can already be seen at airports, shopping malls, and hotels. Adoption of digital signage is expected to increase rapidly given the advantages it provides—customizable content that can be changed easily and frequently to target specific audiences.

Watermarking can be used to enable the audience to connect to this content using their mobile devices. The connection can be provided by embedding the displayed media with a digital watermark. The entire display can be watermarked (i.e., the entire graphic shown on the LCD screen can be embedded), possibly in real time. This watermark can be read by pointing an enabled mobile device at the display. Reading the watermark can facilitate the desired connection to related information about the displayed content, leading to an interactive experience.

The transitory nature of the content displayed on digital signage and the desire to target the content at a location-specific audience makes it ideal for use with watermarking. For example, an advertisement from a national retailer playing over an airport display would want to connect to the local store for that retailer. This can be easily achieved by embedding a different watermark corresponding to each location specific version of the same advertisement.

Other Opportunities

The usage models described above provide opportunities for driving further innovation in digital watermarking technologies. The usual attributes of imperceptibility, speed and robustness remain crucial driving factors. The new usage models pose additional possibilities and challenges for each of these existing attributes and create new attributes that become relevant when detecting from screens and over-the-air.

Robustness and Imperceptibility

Many of the new usage models rely on the survivability of the watermark signal through D-A-D transformations. Surviving this cycle of transformations is more challenging than digital-to-digital transformations. For images, the watermark signal must be capable of recovering from geometric distortions. For detecting watermarks in over-the-air audio, multi-path interference and background noise issues must be addressed. For all media types, the watermark should be capable of surviving compression cycles (encoding and decoding). This is particularly important for video encoded at lower bit rates for transfer on slow speed networks. With the increasing proliferation of broadband access over mobile devices, this is likely to be less of an issue for consumer quality video in the future.

For these emerging usage models to gain broad acceptance, the watermark signal should be imperceptible. The model of detecting watermarks from display screens opens up new areas of innovation. For example, the watermark signal can be tailored towards screen display and detection. In addition, the resolution of the watermark can be altered for optimal detection by changing the size of the displayed image (or video) on screen by zooming in or out. Also, given that the color gamut on screen is larger than that for print, there can be opportunities for taking advantage of color for imperceptibility and robustness.

Ease of Use

Ideally, the model of pointing a mobile device to a watermarked source (screen image, audio, video, etc.) should work without any detailed instruction to the user. Instructions, if any, should be fairly intuitive, e.g. slowly move the mobile device closer to the marked media starting at arm's length. To support this intuitive interface, speed of watermark detection becomes important. Ideally, capture of the media as well as watermark detection should both take place in real-time. For detecting screen images, this means that the camera on the mobile device should capture and detect at a high frame-rate so that there is no perceived drop in frame-rate observed on the screen of the capturing device. Supporting this model requires optimized detectors, possibly taking advantage of some of the intrinsic capabilities of the mobile devices (multiple cores, graphics capabilities, signal processing primitives, etc.). Audiovisual feedback during the process of watermark detection can also improve ease of use. Such feedback can be used to guide the user to properly position the detecting device for optimal detection.

Transient Watermarks

A transient watermark is one which is embedded into the media just before the point of consumption. For instance, a watermark can be embedded into an image just before it is displayed on an LCD screen. Transient watermarks can be applied to media that has no prior watermark to enable linking such media to mobile devices. Embedding of transient watermarks often requires real-time embedding capabilities, particularly when dealing with media such as video. Alternatively, one can treat all graphics rendered on a digital display as a video stream and embed this stream. A novel embedding approach, in this case, is to use the device's graphics capabilities to embed the watermark signal in the rendered graphics.

As mentioned earlier, to support the emerging usage models, the watermark signal should be robust to survive D-A-D transformations. Increasingly, digital watermarks are introduced at media origination to support applications including copyright communication and broadcast monitoring, and measurement. Some of these applications are based exclusively in the digital domain. Consequently those watermarks may not be well suited for the emerging usage models. However, such watermark signals already provide the digital identity required for these usage models, which can be translated into a transient watermark at the time of media consumption. For instance, consider a video stream that already contains a watermark that cannot be detected from the displayed version of the video using a mobile device. A new transient watermark can be embedded in the video before display. The transient watermark can then be designed specifically to suit mobile detection from a display.

Ease of Embedding

For the new usage models to succeed, the embedding process should be automated and easily accommodated in existing workflows. The speed of the embedding operation is important in most cases, particularly for transient watermarks described above where real-time embedding may be desired.

One implementation for transient watermarks is to introduce the watermark in the form of an overlay that is layered on top of the existing video. In this case the watermark layer is analogous to a transparency placed above the displayed content. The advantage of this technique is that it circumvents the traditional route of embedding the watermark into the content. As a result, this operation can be performed rather quickly for real-time watermark insertion.

Detection Framework

For watermarking to provide an intuitive interface and user experience, a detection framework must be provided to encompass multiple watermarking technologies. This framework should be capable of determining the appropriate watermark detection engine to employ for the media being acquired by the detector, with minimum intervention from the user.

Ideally, the user should not have to select the appropriate detector for linking to specific captured content. For instance, the detection framework should ideally be able to determine the appropriate audio watermark detection engine based on whether the acquired content is audio from broadcast television or radio or a movie theater. Achieving this capability is aided by equipping the detection framework with contextual awareness (e.g., time of day), sensory data (e.g., proximity, lighting), and other added intelligence (e.g., location from GPS coordinates). The detection framework can also be arranged to perform a quick assessment of the type of watermark present before performing intensive detection operations using a specific detection engine. The signaling for these different content dissemination avenues may also be designed with the detection framework in mind to provide a common protocol for signaling the type of technology employed.

The detection framework can also encompass complementary content-based identification technologies such as fingerprinting.

One form of audio fingerprinting technology said to be suitable with ambient audio is disclosed in Google's patent application 20070124756. Another is disclosed in U.S. Pat. No. 7,359,889 and patent publication 20070143777 to Shazam, and in Wang, *The Shazam Music Recognition Service*, Communications of the ACM, Vo. 49, No. 8, August, 2006, pp. 44-48. Still other fingerprinting techniques are disclosed in Nielsen's patent publications 20080276265 and 20050232411. (Nielsen maintains a fingerprint database by which it can identify broadcast television by reference to audio fingerprints.)

The framework can provide the data sampling, pre-processing, filtering, and transformations that are common to the applicable identification technologies. An example of such processing is FFT decomposition for frequency analysis. The detection framework should be flexible to accommodate additional identification technologies or combination techniques based on two or more technologies.

Figure 2:
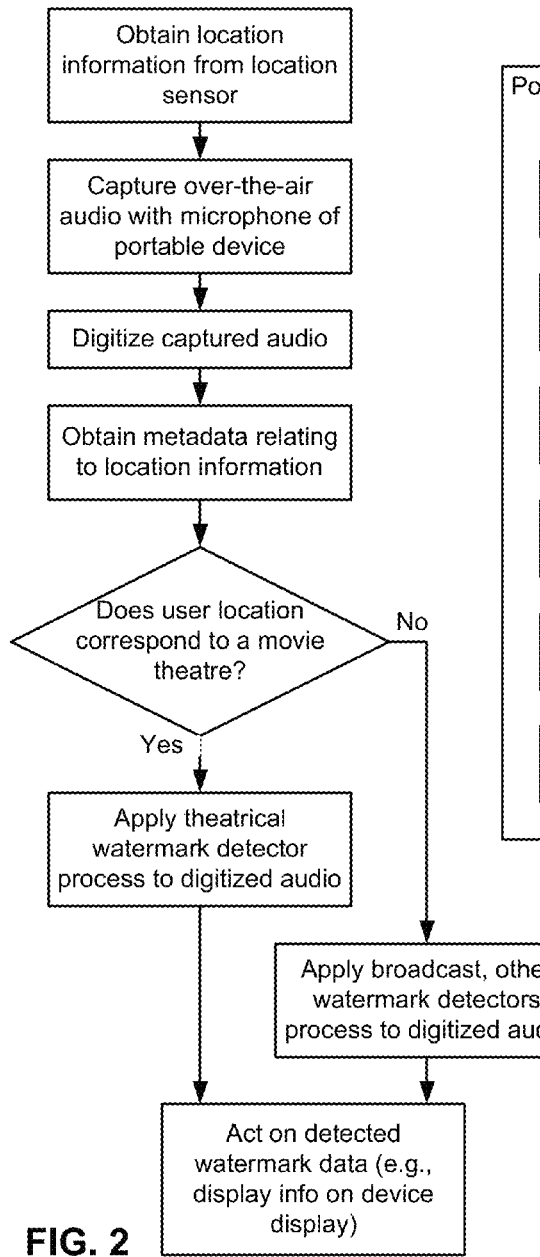
FIG. 2 shows a flowchart of one particular process employing aspects of the present technology.

FIG. 2 shows one embodiment of such technology. The process begins by establishing the location of the device, such as by GPS or other means. If the location information is in the form of latitude/longitude, it can be submitted to a web service to obtain descriptors relating to that place.

One such web service is Microsoft's MapPoint Web Service. This service offers a function, GetLocationlnfo, that takes as input a latitude/longitude, and returns as output metadata relating to that location—such as a street address. This street address can then be submitted to a service, such as Google, to identify the building at that location.

Another geolocation service is Yahoo's GeoPlanet service, which returns a hierarchy of descriptors such as "Rockefeller Center," "10024" (a zip code), "Midtown Manhattan," "New York," "Manhattan," "New York," and "United States," when queried with the latitude/longitude of the Rockefeller Center. Another related service is GeoNames<dot>org. (It will be recognized that the "<dot>" convention, and omission of the usual http preamble, is used to prevent the reproduction of this text by the Patent Office from being indicated as a live hyperlink.) In addition to providing place names for a given latitude/longitude (at levels of neighborhood, city, state, country), and providing parent, child, and sibling information for geographic divisions, GeoNames also provides functions such as finding the nearest intersection, finding the nearest post office, finding the surface elevation, etc.

From the web look-up, the method determines whether the user is at a location corresponding to a movie theatre.

Meanwhile, or next, the device captures and digitizes ambient audio. If the location is determined to be a movie theatre, the device applies a watermark detector process corresponding to audio watermarks expected to be found in theatrical presentations of motion pictures (e.g., digital cinema watermarks). This process can include digitizing the captured audio at a particular sample rate optimized for detection of such watermarks, transforming the sampled audio to the frequency domain, such as by an FFT (with a number and spacing of bins particularly corresponding to the expected watermark). It can also include applying windowing and other filters as may be associated with detection of the digital cinema watermark. Finally, the form of analysis applied to extract the encoded payload from the processed data is the one appropriate for the expected watermark.

If the location does not correspond to a movie theatre, the device proceeds differently. It may try a series of different decoding operations, looking for one that yields valid output data. (Most watermarking protocols include error checking capabilities, so correct decoding can be confirmed. In fingerprinting, a "no-match" from the database can indicate that a different fingerprint algorithm/database should be tried.)

Perhaps the most likely watermark would be the one commonly found in radio broadcasts—inserted for Arbitron by radio broadcasters for audience measurements purposes. Another one may be the watermark commonly found in television broadcasts—inserted for Nielsen by television broadcasters. Still another one may be a watermark inserted by music distributors, such as Amazon, to identify certain electronically-delivered entertainment content. A series of such decoding regimes may be applied (with more probable processes applied first), until one yields valid output data.

The action taken by the portable device depends on the watermark decoded (or fingerprint found).

For example, the digital cinema watermark is a forensic mark that conveys tracking information, which is carried into subsequent legitimate or illegitimate copies of the content. Inserted immediately after the digital content is decrypted, the forensic watermark typically comprises a recurring 35 bit payload, indicating the theatre and screen being viewed (by a location code), together with the date and time (a timestamp). Further details are available from the Digital Cinema System Specification, published at the web site dcimovies<dot>com.

From the location and the time, the movie title can readily be determined, e.g., from online movie listings. (Or, an identifier corresponding to the movie title can be encoded in the watermark, and resolved by reference to a corresponding database.)

By knowing the movie title, the user's device can link to various related content, e.g., actor biographies, out-take reels, script text, etc. Knowledge of the location, and the presentation time, allows further customization of related content, e.g., happy hour promotions at a nearby brewpub, etc.

The device can also present a synchronized display of subtitle information (e.g., closed-captioning) corresponding to text spoken in the movie.

From the decoded location code and timestamp, the device consults public and/or private databases to identify the movie being screened. With a movie identifier, the device links to an online repository containing the movie script—or other source of subtitle data.

If the watermark contains a running timecode (indicating instantaneous position in the movie), the text from the repository can be presented to the user on the screen of the device—advancing in correspondence with the timecodes. However, the timestamps in current digital cinema watermarks do not allow for very accurate synchronization. So other ways of synchronization can be employed.

One alternative is to use features of the detected audio, e.g., audio landmarks or fingerprints, to identify the current location within the movie (by comparing against a database of known landmark features—each associated with a respective SMPTE timecode). The corresponding subtitle for that scene of the movie, or excerpt of dialog, can then be displayed. (The subtitles can be indexed by the SMPTE timecodes.) The fingerprint technologies detailed earlier can be used for this purpose.

Once the current location within the motion picture has been determined, the subtitle data can be advanced in real-time with essentially no further adjustment. However, to assure that unforeseen difficulties do not desynchronize the subtitling, audio landmark checks can be made periodically (e.g., once per minute) to assure that the movie presentation is advancing as expected.

Another way that display of subtitle data can be synchronized with the displayed motion picture is by image landmarks (video fingerprints)—detected using a camera portion of the portable device. (Various video fingerprints are known; one is detailed in Vobile's patent publication 20070253594.) As with audio landmarks, the video landmarks can be used to identify the current location in the motion picture, so that corresponding subtitling downloaded from the internet (or other source) can be presented on the screen of the user's portable device.

If there are several users of such portable devices within the movie auditorium, it is redundant for each of them to perform all of the processing and searching detailed above. Instead, information determined by one user can be shared with others.

The sharing can be accomplished by various known means, including ad hoc wireless networks, infrared networking, Bluetooth, WiFi, etc. The information shared can be the decoded watermark data, the SMPTE timecode for the present instant (determined by reference to content features, etc.), the current subtitle phrase(s), movie-related metadata obtained from the internet, etc.

In still other arrangements, the theatre owner can distribute some or all of this information to users in the auditorium. With its access to the digital version of the content—often including SMPTE timecodes and subtitling data—together with superior hardware and network infrastructure, the theatre owner can easily distribute timecodes, subtitles, and/or other information using the foregoing means. Moreover, with its control over the audio and imagery presented in the auditorium, the theatre operator can convey information to the consumers by other signaling means—such as by its own added audio or video watermark, infrared projection of data signals on the screen, etc.

The subtitle information can be presented on the user's portable device display by itself, or with other information (e.g., in a pane at the bottom of the screen, permitting other applications—such as MySpace, email, etc., to be displayed concurrently). The displayed font may be set by the user (allowing more or less information to be displayed by use of a smaller or larger font), or the subtitling may be delivered in pre-formatted image (video) form.

Oftentimes, subtitling in different languages is available. The user can select a language different than that spoken in the movie—if desired.

By the foregoing arrangements, it will be recognized that movie-goers can glance at their cell phones to review movie dialog they may have missed, e.g., due to hearing impairment, lack of language fluency, distraction, etc. Other information relating to the movie can similarly be presented.

The FIG. 2 arrangement particularly contemplated use of location data to determine, e.g., if the user is at a cinema. Similar principles can be expanded to other circumstances, as shown in FIG. 3.

Figure 3:
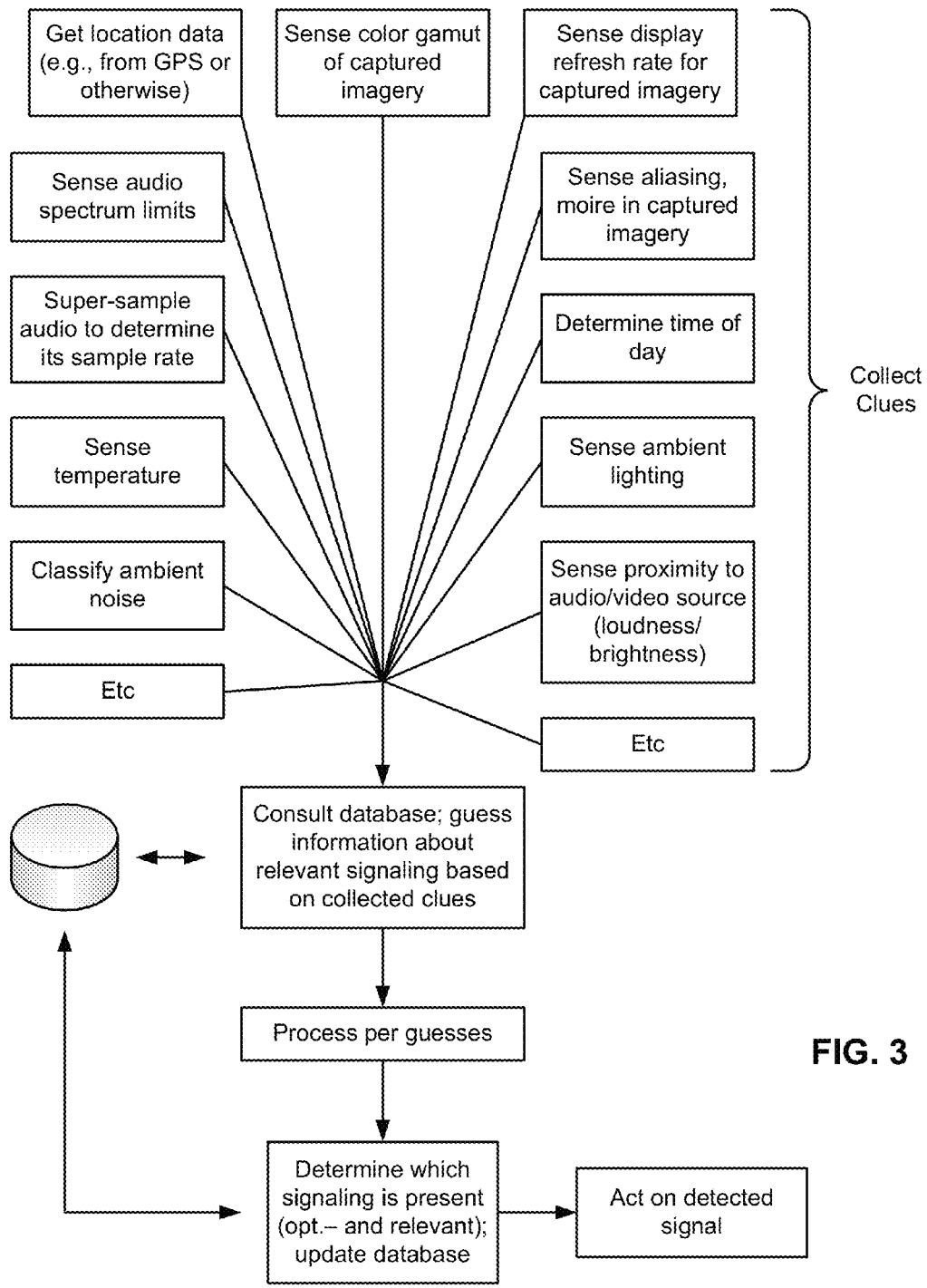
FIG. 3 shows a flowchart of another process employing aspects of the present technology.

In the FIG. 3 arrangement, the device collects a variety of clues that may be useful in identifying the type of watermark (or other signaling, e.g., audio fingerprinting) that may be useful in the user's present context. One clue is location, as before.

Others include features of ambient audio. The sounds impinging on the device microphone can be checked for frequency content and other characteristics. For example, analysis may show that the sounds are limited to a certain mid-frequency band—missing high frequencies and/or low frequencies. The sounds can be checked for dynamic range—indicating presence or absence of level compression. Another clue is generated by super-sampling the ambient audio, allowing the device to detect artifacts from a digital-to-analog conversion (at a lower clock rate). The captured sounds may also include background attributes, e.g., noise patterns that can be associated with certain environments. All these data can be used to infer information about the source of the impinging audio, and the types of signaling that may be relevant.

Other clues can comprise visual features. The color gamut of the subject captured by the device camera may have tell-tale qualities revealing something about the subject being imaged. For example, the color gamut captured from a natural scene will be different than the color gamut captured from the LCD screen of another electronic device. If the subject being imaged is an electronic display, it may have a screen refresh rate that causes visual artifacts (e.g., strobing) to appear in the captured imagery. The refresh rate of the subject can be inferred from the captured data. Similarly, moiré effects may be found in the captured imagery—indicating that the subject is a sampled (e.g., pixilated) image, with a certain orientation and resolution relative to the camera. Again, such parameters of the moiré patterning can be used to infer information about the imaged subject.

Other data can also be collected and evaluated for use as clues. Temperature can be sensed, and used to determine whether the user is in a climate controlled indoor environment, or outdoors. Ambient lighting (which may be from a direction different than the device camera is pointing) is another clue. So is the date and time. So is the loudness of captured audio, or the brightness of captured imagery. If the device has a polarizing filter that can be employed over the imaging sensor, this can give further data. Other data specific to the particular application can also be used.

The clue data collected by the user device is used to query a database. For different combinations of input data, the database serves to identify different signaling schemes that are most-likely to be encountered.

If the device reports a temperature of 70 degrees, in a dark environment, mid-afternoon on a summer day in Los Angeles, the database may respond suggesting that the device should first check for a digital cinema forensic watermark—as detailed above. (This determination may be made even without reference to location data particularly identifying a movie theatre.) If that fails, it may suggest trying to decode the Nielsen broadcast watermark. If that fails, it may suggest processing in accordance with the Shazam fingerprinting algorithm, and submitting the data to the Shazam database for identification. If that fails, it may suggest still other watermark decoding algorithms, etc.

If the device senses a highly band-limited audio spectrum, with limited dynamic range, it may infer it is sensing sound from a commercial advertisement (where band-limiting and multi-band dynamic range compression is commonly used).

In this case it may suggest first looking for Arbitron watermark, followed by a Nielsen watermark, etc.

If the device reports that it is imaging a subject having a particular color gamut, and a particular moiré artifact, the database may respond suggesting that the device should first check for a watermark that is commonly encoded in video entertainment content downloaded from the iTunes store. (This suggestion may be based on the color-gamut indicating an LCD display, and the moiré pattern suggesting a small display.) If that fails, the device should next check for a watermark that Amazon encodes into video entertainment that its online store distributes. If that fails, the device should next check for a personal verification watermark encoded into facial images presented on cell phones for a proprietary e-money system. Etc., etc.

In some arrangements, the database may indicate that one or more different fingerprint calculations and matches should be attempted before watermark decoding is attempted.

The user device attempts the different operations indicated by the database. Desirably, it provides feedback to the database, indicating which operations were tried, which failed, and which succeeded. If one operation succeeded, but shortly thereafter the user continued to try alternate processing approaches suggested by the database, this can indicate that the successful operation was not the one desired by the user, and that a later type of processing (if successful) more accurately served the user's intent. Over time, the database learns what combinations of clues most reliably indicate what types of signaling, and how the user wishes these different types of signals to be handled (and the relevance to be given to each clue in such determination), so that future queries build on the experience of earlier queries. The system thus acts as a Bayesian inference engine—making one or more guesses (i.e., establishing various hypotheses), receiving feedback, and thereby making better guesses in the future.

By sensing different characteristics of captured stimuli (and/or analyzing the captured data to determine such characteristics), querying the database with this information, trying the operations suggested by the database, and continuously refining a model of the process, the system takes on an intuitive behavior—making educated judgments about what it should do in different circumstances.

The database may be shared among a community of users, so experiences of one user help improve the later experiences of other users. A shared, remote database can be accessed by each user, or a local copy of a central database can be obtained periodically, and updates can be periodically sent back to the central database.

Figure 4:
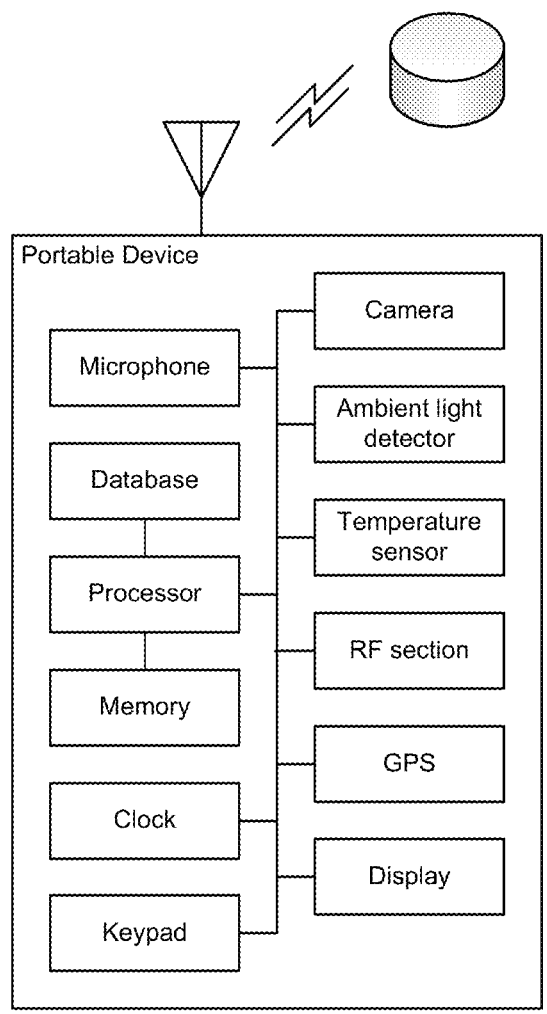
FIG. 4 shows a block diagram of an apparatus employing aspects of the present technology.

FIG. 4 is a block diagram of a portable device of the sort that can be used in the just-described embodiment.

Benefits of Watermarking in Context of the New Usage Models

Distribution/Deployment of Embedded Content

In the new usage models, the distribution of embedded content is in the digital domain. Consequently watermarked content for these usage models can be distributed relatively quickly and inexpensively. As an example, consider the case of digital signage. Watermarked media can be distributed to the digital displays through digital means. Alternatively, the watermarks can be embedded right at the point of display through the use of transient watermarks as described above. The cost of embedding is either incurred by the media distributor or indirectly by the media consumer (for transient watermarks).

Consumer Created Media

Watermarking provides a means to connect analog instances of consumer created media (or User Generated Content) to the Internet. Analog instances refer to displayed versions of the media in the case of images or video content, or over-the-air versions in the case of audio. Consumer created media includes photos, digital videos, podcasts, recordings, etc. Such content is usually dynamically created, transitory in nature (i.e., is of unknown longevity), and is enormous in volume. However, it is well-suited for watermarking where a unique payload can be embedded into the content to identify it. In comparison, the nature of this content makes it challenging for use with content-based identification technologies which require prior analysis of the content.

Live Content

Live content, whether produced commercially or by consumers, poses unique challenges for content identification technologies. This is particularly true for the usage models described above, where users may desire to link to appurtenances related to the live content as it is being viewed or heard. Lack of a time lag between content creation and consumption generally constrains the type of content identification techniques that can be employed in such scenarios. Content-based identification schemes require pre-analysis of the content before the back-end database can be populated. For live content, this raises the costs of solutions based on content-based identification. In comparison, watermarking is well-suited for such scenarios, since it does not require pre-analysis of the content before use in the system. The payload carried by the watermark is generally completely independent of the content. This allows the back-end database to be pre-populated with a payload (or payloads) specifically designated for the live content. Therefore, a solution based on watermarking can be implemented at relatively lower cost.

Push vs. Pull Model

Watermarking allows for placing the control of media enhancement in the hands of the media creator or owner. Individuals who create the content frequently may want to directly manage the media linking experience for users. This control lends itself to a push model where the media is watermarked by the creator or owner and pushed to the aggregator (or distributor). This approach also reduces the overhead for the aggregator. For example, media creators may embed watermarks in their photos that are uploaded to a photo-sharing site. The watermark can either be an ID provided by the site or can be a more descriptive payload that can link directly to enhanced experiences. When those watermarked photos are viewed on the site or in digital picture frames, the person viewing the image can point a mobile device at the photo, read the watermark, and then connect to the photo-sharing site. In this scenario, minimal intervention is required from the aggregator since it would just have to associate the ID with the photo.

In a pull model, the aggregator would have to pull the requisite information from the media to enable the connection. Consider implementing the photo-sharing example using content-based identification technology [3]. The photo-sharing site has to decide to include content-based information about the uploaded photo into its database. In this case, the onus for ensuring identification of the photo in later use rests solely with the identification service provider rather than the content owner.

For many media owners, the ability to control the enhancements to their images and video can be very important. For small content creators, watermarking the content themselves may be the most suitable option for creating links between the analog instances of their content and the Internet.

Measurement and Analysis

Watermarks provide the ability to determine the source of the content. Multiple distributors of the same content can easily be identified. For example, the same advertisement airing on two different channels can a carry different payload for each channel. Detection of the payload can identify the channel on which the ad is airing. This capability can be used for effective measurement and analysis of content consumption and content flow.

Such analysis can facilitate different models for monetization and placement. For instance, in the sharing examples provided in the usage models above, referrals can be rewarded. An app shared can result in a reward at the app store for the user whose screen the app was shared from.

Customized Responses

The ability of the watermark to carry different payloads for copies of the same content can enable customized responses on detection. Different renditions of the same media, say a version played on a mobile device versus a version played on a large high resolution display, can evoke different detection responses. On detection from the mobile version, the detecting user can be linked to the store for the mobile version. On detection from the high resolution version, the detecting user can be linked to a site for a high definition version (or physical disc).

The watermark payload can also encode different responses for different geographies, for the same content. Part or all of the response on detection can be encoded in the payload itself, allowing for the possibility of making the system independent of the back end processing if so desired. This functionality would require sufficient watermark payload capacity for encoding the response in the payload.

Aesthetic and Physical Constraints

Aesthetic considerations can limit the type of identification technology used. Overt symbologies such as bar codes are not applicable in situations where there is a premium on the aesthetic quality of the media. Since watermarks can be embedded imperceptibly, they do not alter the aesthetic qualities of the underlying media.

Sometimes the size of the displayed media places a constraint on the type of identification technology used. Again, technologies such as bar codes occupy additional real estate and may not be applicable in situations where media is consumed on small form factor devices (e.g. image or video displayed on a mobile screen). Watermarks do not occupy any additional real estate beyond that required for the media itself.

Challenges In Market Adoption

The proliferation of media consumption on mobile devices and the enabling factors make the usage models described above viable. However, several challenges hinder the adoption of applications based on these models.

Availability of Watermarked Media

One of the biggest challenges in adoption is the availability of watermarked media. A substantial amount of media must be embedded with digital watermarks for any of the usage models described above to be widely adopted. Often, the ability to enable a broad range of mobile devices with watermark detectors is also dependent on broad availability of watermarked media. Conversely, media owners are unlikely to introduce watermarks in their content without the availability of enabled devices. This creates a "Catch-22," due to the co-dependency of the watermarked media and watermark detectors. One solution to this issue is to begin with applications where the content is already watermarked, e.g., broadcast television content, and then to expand into other media types. Another solution is based on the use of transient watermarks, where the media content need not be watermarked at its source. Instead, the transient media can be watermarked as it is consumed (displayed or played). With this concept, applications can be deployed faster, since existing content can be watermarked just before consumption.

Availability of Enabled Devices

As mentioned above, availability of devices enabled with digital watermarking (and/or fingerprinting) applications is needed. Historically, achieving broad deployment of watermarking applications across a wide range of mobile devices has been challenging due to the large variation in device capabilities. However, the percentage of new devices that are technically capable of reading watermarks is increasing rapidly as technology advances. A short-term solution is to focus on just a few of the most capable mobile devices to enable rapid deployment. This strategy can result in compelling applications that take advantage of specific capabilities of the targeted devices. These applications can then serve as device differentiators that enable intuitive interfaces and spur broader adoption of the new and emerging usage models. As more mobile devices are launched, applications which differentiate devices with similar features will drive sales and product preference.

As technology continues to advance, it is expected that the majority of mobile devices will be technically capable of reading digital watermarks. At that point, the landscape shifts again to a stronger focus on software as a standalone product. The capable devices can be enabled to read watermarks by the device owner through installation of aftermarket available software that meets the device owner's needs.

Competing and Complementary Technologies

Competing technologies that can be employed instead of digital watermarking include overt symbologies (e.g. barcodes) and protocols for inter-device communication (e.g. Bluetooth). Although these technologies are readily available, they are not as easy and intuitive for users as the usage models described above. Overt symbols occupy real estate on screen and may not always be practical on smaller form factor displays. Bluetooth, while generally available, requires specific setup and pairing of devices for communication.

Complementary technologies include content-based identification and retrieval technologies (e.g. digital fingerprinting) which can be used in conjunction with digital watermarking to provide effective applications that take advantage of the merits of both technologies. For example, digital fingerprinting can be effective for legacy media that does not contain a watermark, whereas digital watermarking can be used effectively when multiple identities must be imparted to the same media. A combination approach consisting of the use of watermarking and content-based identification techniques can provide a more effective end-solution.

Viable Business Models

Ultimately, success in the market will be defined by the existence of viable business models. While it is premature to foretell what form successful business models will eventually take, it is prudent to contemplate avenues for monetization. The click-through model described above, where watermark detection re-routes the user to a pertinent destination on the Internet, can naturally lead to opportunities for monetization. As mobile media and devices continue to proliferate and become widely used, digital watermarking can open new revenue streams for media aggregators and device manufacturers looking to differentiate their products.

Conclusion

It will be recognized that technology detailed above allows a portable device to serve as a media "forager"—employing its microphone and/or camera (and/or other sensors) to capture information about the user's environment, and then respond in desired ways.

The present assignee has published a great deal of information about related systems and technologies in the patent literature—a body of work with which the artisan is presumed to be familiar. Included are U.S. Pat. Nos. 6,122,403, 6,590,996, 6,947,571, and published patent application 20070156726.

Nielsen's watermark is understood to follow the teachings of its U.S. Pat. Nos. 7,006,555 and 6,968,564. Arbitron's watermark is understood to follow teachings of its U.S. Pat. Nos. 5,450,490, 5,764,763, 6,871,180, 6,862,355, and 6,845,360.

While the arrangements detailed above focused on watermark-based approaches, the same or similar functionality can often be realized with fingerprint-based approaches.

Although disclosed as complete systems, subcombinations of the detailed arrangements are also separately contemplated.

While this specification has detailed particular ordering of acts, and particular combinations of elements, in the illustrative embodiments, it will be recognized that other contemplated methods may re-order acts (possibly omitting some and adding others), and other contemplated combinations may omit some elements and add others, etc.

The design of cell phones and other devices referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), and an interface for communicating with other devices (which may be wireless, as noted above, and/or wired, such as through an Ethernet local area network, a T-1 internet connection, etc).

The functionality detailed above can be implemented by dedicated hardware, or by processors executing software instructions read from a memory or storage, or by combinations thereof. References to "processors" can refer to functionality, rather than any particular form of implementation. Processors can be dedicated hardware, or software-controlled programmable hardware. Moreover, several such processors can be implemented by a single programmable processor, performing multiple functions.

Software instructions for implementing the detailed functionality can be readily authored by artisans, from the descriptions provided herein.

Typically, each device includes operating system software that provides interfaces to hardware devices and general purpose functions, and also includes application software which can be selectively invoked to perform particular tasks desired by a user. Known browser software, communications software, and media processing software can be adapted for uses detailed herein. Software is commonly stored as instructions in one or more data structures conveyed by tangible media, such as discs, memory cards, ROM, etc. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a remote server, different tasks can be performed exclusively by one device or the other, or execution can be distributed between the devices. Extracting watermark or fingerprint data from captured media content is but one example of such a task. Thus, it should be understood that description of an operation as being performed by a device is not limiting but exemplary; performance of the operation by another device, or shared between devices, is also contemplated.

To provide a comprehensive disclosure without unduly lengthening this specification, applicants incorporate by reference the documents and patent disclosures referenced herein. (Such documents are incorporated in their entireties, even if cited above in connection with specific of their teachings.)

The particular combinations of elements and features in the above-detailed embodiments are exemplary only; the interchanging and substitution of these teachings with other teachings in this and the incorporated-by-reference documents are also expressly contemplated and intended.

REFERENCES

[1] Alattar, A., "Smart Images Using Digimarc's Watermarking Technology", SPIE's 21th Symposium on Electronic Imaging, vol. 3971, pp. 264-273 (2000).
[2] Kalker, T, and Haitsma J., "Robust Identification of Audio Using Watermarking and Fingerprinting", Multimedia Security Handbook, CRC Press, pp. 261-281 (2005).
[3] Jürgen Herre, "Content-Based Identification (Fingerprinting)", Digital Rights Management, Lecture Notes in Computer Science, pp. 93-100, Springer Berlin/Heidelberg, (2003).
[4] A. Wang, "An industrial-strength audio search algorithm", Proceedings ISMIR 2003, pp. 7-13, 2003.
[5] ABI Research, "Analyst Insider", Jun. 2, 2008.

We claim:

1. A portable device comprising a processor, a memory, one or more input sensors for capturing data and an output device the memory including instructions by which the processor can process the captured data to derive plural-bit data therefrom according to plural different digital watermarking and/or content fingerprinting schemes, the one or more input sensors including a microphone and/or an image sensor, the memory further including instructions causing the processor to analyze captured data for one or more clues, and based on said clues determine an order in which plural of said schemes should be applied to the captured data; wherein the input sensor comprises a first sensor for capturing first data, and a second sensor for capturing second data, the first data comprising audio or image data, the second data comprising data that is not audio or image data, wherein the processor analyzes the captured second data for clues to determine the order in which plural of said schemes should be applied to the captured first data.

2. A method practiced in a movie auditorium, comprising the acts: capturing audio or image data from a movie presentation, using a portable device; by reference to the captured data, identifying a particular temporal location within a movie; accessing information in a subtitle repository from the portable device, said accessing making reference to the identified temporal location; and presenting subtitle information on a display screen of said portable device, in synchrony with the movie presentation; wherein the method is performed using a computer or processor in the portable device to decode plural-bit data steganographically encoded in the captured data, and identifying the movie by reference to this decoded data.

3. The method 2 that further includes, by reference to the captured data, identifying the movie.

4. The method 2 that includes identifying the particular temporal location by reference to audio or visual landmarks within the movie.

5. The device of claim 1 in which said instructions cause the device to capture the data at a sampling rate sufficient to determine whether the content from which the data is captured is natural, analog content, or digital content.

6. The device of claim 5 in which said instructions enable the processor to distinguish natural, analog content from digital content, by reference to (a) artifacts from a digital-to-analog conversion; (b) color gamut; (c) visual strobing; or (d) moiré effects.

7. A portable device comprising a processor, a memory, one or more input sensor for capturing data from content, and an output device, the memory including instructions by which the processor can distinguish natural, analog content from digital content, and take an action based on such distinction wherein the processor can process the captured data to derive plural-bit data therefrom according to plural different digital watermarking and/or content fingerprinting schemes, the one or more input sensors including a microphone and/or an image sensor, the memory further including instructions causing the processor to analyze captured data for one or more clues, and based on said clues determine an order in which plural of said schemes should be applied to the captured data; wherein the input sensor comprises a first sensor for capturing first data, and a second sensor for capturing second data, the first data comprising audio or image data, the second data comprising data that is not audio or image data, wherein the processor analyzes the captured second data for clues to determine the order in which plural of said schemes should be applied to the captured first data.

8. The device of claim 7 in which said instructions enable the device to perform said distinguishing by reference to artifacts from a digital-to-analog conversion.

9. The device of claim 7 in which said instructions enable the device to perform said distinguishing by reference to color gamut.

10. The device of claim 7 in which said instructions enable the device to perform said distinguishing by reference to visual strobing.

11. The device of claim 7 in which said instructions enable the device to perform said distinguishing by reference to moiré effects.

12. The device of claim 7 in which said action comprises deriving plural-bit data from the captured content according to a digital watermarking or content fingerprinting scheme.

13. The portable device of claim 1 in which said instructions cause the processor, based on said clues, to determine an order in which plural different watermarking schemes should be applied to the captured data.

14. The portable device of claim 1 in which said instructions cause the processor, based on said clues, to determine an order in which plural different content fingerprinting schemes should be applied to the captured data.

15. The portable device of claim 1 in which the second sensor comprises a temperature sensor.

* * * * *